(12) United States Patent
Kimura (10) Patent No.: US 7,390,934 B1
(45) Date of Patent: Jun. 24, 2008

(54) APPARATUS AND METHOD FOR AIDING IN THE REMOVAL OF ENRICHED URANIUM FROM SOILS

(75) Inventor: Richard Thaddeus Kimura, Richland, WA (US)

(73) Assignee: Areva NP Inc., Lynchburg, VA (US)

( * ) Notice: Subject to any disclaimer, the term of this patent is extended or adjusted under 35 U.S.C. 154(b) by 732 days.

(21) Appl. No.: 10/752,751

(22) Filed: Jan. 6, 2004

(51) Int. Cl.
*G21F 9/28* (2006.01)
*C01G 56/00* (2006.01)

(52) U.S. Cl. ............... 588/1; 423/3; 423/6; 423/10; 588/6; 588/7

(58) Field of Classification Search ............ 423/6, 423/7, 8, 3, 10; 588/6, 7, 1
See application file for complete search history.

(56) References Cited

U.S. PATENT DOCUMENTS

| | | | |
|---|---|---|---|
| 4,668,482 A | 5/1987 | Hermens et al. | |
| 5,223,181 A * | 6/1993 | Wilson et al. | 588/1 |
| 5,545,797 A * | 8/1996 | Ewing et al. | 588/10 |
| 5,640,701 A * | 6/1997 | Grant et al. | 588/1 |
| 5,878,355 A * | 3/1999 | Berg et al. | 588/2 |
| 6,010,671 A | 1/2000 | Kimura | |
| 6,165,367 A | 12/2000 | Partridge | |
| 6,319,389 B1 * | 11/2001 | Fountain et al. | 205/583 |

\* cited by examiner

*Primary Examiner*—Tim Vanoy
*Assistant Examiner*—James Fiorito
(74) *Attorney, Agent, or Firm*—Kenyon & Kenyon LLP (57) ABSTRACT

A method and apparatus for removing uranium (IV) and uranium (VI) from sands and soils. The method and device assays a volume of soil and determines a presence and position of uranium enrichment. A concentration of uranium enrichment is determined, and compared to a threshold concentration. The volume of soil is processed and transported to a coarse screen, deck screen and classified in a classifier. In the classifier, the volume of soil is separated into a washed and fines fraction, assayed and transported to a uranium recovery facility, then transported to a silicon removal process and subsequent ammonia and metals removal processes.

19 Claims, 8 Drawing Sheets

| FIG.2A | FIG.2C | FIG.2F |
| FIG.2B | FIG.2D | FIG.2G |
|  | FIG.2E |  |

APPARATUS AND METHOD FOR AIDING IN THE REMOVAL OF ENRICHED URANIUM FROM SOILS

FIELD OF THE INVENTION

The current invention relates to removing unwanted materials from soils. More specifically, the current invention relates to a method and apparatus to aid in removing enriched uranium from soils.

BACKGROUND INFORMATION

Processing of uranium from raw (natural) form to an enriched usable form, to be used in an enriched nuclear fuel assembly, for example, requires many steps. The uranium, usually in the form of an ore, is processed using various chemicals to remove impurities and enrich the fissionable fraction of the uranium. In a process for making a nuclear fuel assembly, for example, the uranium is usually taken from the ore and the concentration of fissionable uranium atoms is increased on a per volume basis by removing impurities. During this enrichment process, water and soils contact the uranium and become incorporated therein. Sludges also form during the processing or are present in the soils. The sludges, water and soils, as a result of contact with the uranium, often require treatment or long-term disposal to prevent further spread of uranium contamination. Long-term disposal, although a viable option for a facility operator, increases the ultimate economic costs of the facility and limits the overall amount of uranium available to be incorporated into the final product.

To further improve the economy of the enrichment facility, various methodologies have been developed to limit the amount of radioactive wastes. To limit the amount of uranium containing wastes, U.S. Pat. Nos. 6,010,671, 6,165,367 and 4,668,482 provide for removal of uranium contamination from differing waste streams.

Currently, there is no process or apparatus which allows for a cost effective removal of uranium from soils when the soils contain chemicals such as ammonium salts, acidic fluorides and other contaminants. Soils containing uranium and base chemicals are either maintained in an in-situ state and capped from external environmental forces or are removed from the ground, deposited into barrels and placed in long term storage.

There is a need to provide an apparatus and method to remove uranium (IV) and uranium (VI) from soils and sands especially when ammonium salts and acidic fluorides are in the soils and sands.

There is a further need for the apparatus and method to remove uranium (IV) and uranium (VI) to minimize ultimate disposal volumes of contaminated waste for nuclear processing facilities.

There is a still further need to provide a method and apparatus for removing uranium (IV) and uranium (VI) from soils, while providing a system which interfaces with existing treatment options for sludges and water processing for uranium contamination.

There is a further need for an apparatus and method to allow uranium (IV) and uranium (VI) contained in soils and sands to be reused and incorporated into a final desired uranium containing product, thereby limiting the amount of uranium needed for processing.

SUMMARY

It is therefore an objective of the present invention to provide an apparatus and method to remove uranium (IV) and uranium (VI) from soils and sands which may contain ammonium salts and acidic fluorides.

It is also an objective of the present invention to provide a method and apparatus to remove uranium (IV) and uranium (VI) to minimize ultimate disposal volumes of contaminated waste.

It is also an objective of the present invention to provide a method and apparatus for removing uranium (IV) and uranium (VI) from soils, while providing a system which interfaces with existing treatment options for sludges and water processing for uranium contamination.

It is also an objective of the present invention to provide a method and apparatus which will allow uranium (IV) and uranium (VI) to be reused and incorporated into a final desired uranium containing product, thereby limiting the amount of uranium needed for processing.

These and other objectives are achieved as illustrated and described. The present invention provides a method for aiding in the removal of uranium from soil. The invention comprises assaying a volume of soil using an in-situ gamma energy analyzer, determining a presence and position of uranium enrichment in the volume of soil and determining a concentration of uranium and uranium enrichment of the volume of soil. The invention also comprises comparing the concentration of uranium and uranium enrichment in the volume of soil to a threshold value, processing the volume of soil when at least one of the concentration of uranium and the uranium enrichment of the volume of soil exceeds the threshold value, establishing a target cleanup level for the volume of soil, transporting the volume of soil to a coarse screen and screening the volume of soil through the coarse screen, wherein the volume of soil is screened into a volume of soil-passing through the coarse screen and a volume of soil not passing through the coarse screen. The invention further provides for assaying the volume of soil not passing through the coarse screen for radioactivity to the target cleanup level, segregating a section of the volume of soil not passing through the course screen and exceeding the target cleanup level, transporting the volume of soil passing through the coarse screen to a deck screen, adding a volume of water to the volume of soil passing through the coarse screen, screening the volume of water and the volume of soil passing the coarse screen through the deck screen to obtain a volume of soil passing the deck screen and a volume of soil not passing through the deck screen and assaying the volume of soil not passing through the deck screen for radioactivity to the target cleanup level. The invention further provides for segregating a section of the volume of soil not passing through the deck screen and exceeding the target cleanup level, transporting the volume of soil passing the deck screen to a classifier, classifying the volume of soil passing the deck screen in the classifier into a washed fraction and a fines fraction, assaying the washed fraction and the fines fraction with an energy analyzer, and transporting the fines fraction to a uranium recovery facility.

The present invention also provides an apparatus for recovery of uranium from soils. The apparatus for recovering uranium from soils includes in-situ energy analyzer configured to analyze a volume of soil, and determine a concentration of uranium and uranium enrichment in the volume of soil, and a comparing arrangement configured to compare the concentration of uranium and uranium enrichment in the volume of soil to a threshold value. The present invention also provides a transporting arrangement configured to receive the volume of soil from the comparing arrangement configured to compare the concentration of uranium and the uranium enrichment, the transporting arrangement configured to transport the volume of soil from a start point to an end point. The present invention also provides a coarse screen positioned along the transporting arrangement, the coarse screen configured to receive the volume of soil, wherein the volume of soil is screened into a volume of soil passing through the coarse screen and a volume of soil not passing through the coarse screen, the coarse screen configured to deposit the volume of soil passing through the coarse screen onto the transporting arrangement for a next processing. The present invention also provides an energy analyzer positioned at the coarse screen, the energy analyzer configured to assay the volume of soil not passing through the coarse screen and a deck screen positioned along the transporting arrangement, the deck screen configured to receive the volume of soil passing through the coarse screen into a volume of soil passing the deck screen and a volume of soil not passing the deck screen, the deck screen configured to deposit the volume of soil passing the deck screen on to the transporting arrangement for a further processing and an energy analyzer positioned at the deck screen configured to analyze the volume of soil not passing the deck screen. The present invention also provides for a water adding arrangement configured to add a volume of water to the deck screen and the course screen. The present invention also provides a classifier configured to accept the volume of water and the volume of soil passing the deck screen and separate the volume of soils passing the deck screen into a washed fraction of soils and a fines fraction of soils, and an energy analyzer configured to analyze the washed fraction of soils and the fines fraction of soils and a pump configured to pump a slurry made from the fines fraction of soils.

DETAILED DESCRIPTION

Figure 1:
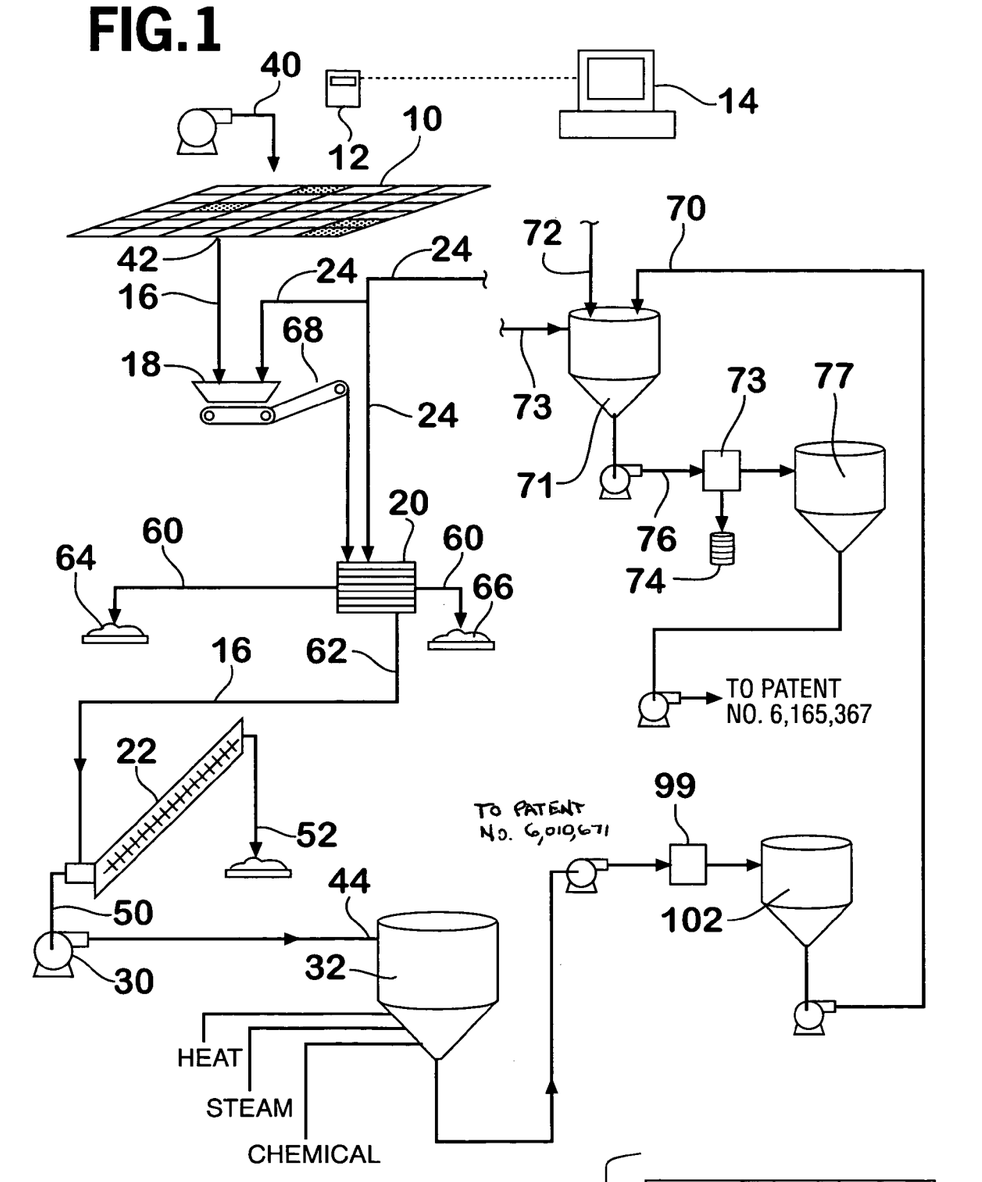
FIG. 1 presents a layout of an apparatus for separating uranium (IV) and uranium (VI) from soils in accordance with the current invention.

FIG. 1 presents a layout of an apparatus for separating uranium (IV) and uranium (VI) from soils in accordance with the current invention. The apparatus and method of the current invention allows for a significant volume reduction in uranium-contaminated soils. Through use of the apparatus and method of the current application, contaminated soil disposal costs can be reduced up to 85% or more after uranium removal.

The present invention provides for separation of uranium, such as uranium (IV) and (IV), from soils and sands which contain acidic fluorides, ammonium salts and contaminants not easily dewatered by conventional soil washing processes due to the presence of slimes add sludges. The present invention provides for recovery of uranium, ammonia and soluble silicon and may be used in conjunction with U.S. Pat. Nos. 4,668,482, 6,010,671 and 6,165,367 which are incorporated herein by reference. The present inventions prepare the liquid wastes for ammonia recovery and ion exchange processes. The acidic fluorides mixed with silica produce soluble silicon which is removed in preparation for uranium or ammonia recovery.

A volume of soil 10 is assayed using an in-situ energy analyzer 12 to determine the presence of uranium in the volume of soil 10. The analyzer 12 may be an in-situ high-purity germanium field gamma energy analyzer, as an example. Other energy analyzers may be used depending on the contamination type and concentration of the contamination.

A presence and position of uranium enrichment in the volume of soil 10 is then determined. The analyzer 12 may be configured to determine an approximate concentration of radioactivity of discrete sections of the volume 10. The radioactivity readings of the volume of soil 10 are then compared to upper and lower threshold values. The upper threshold value may be 4% uranium 235 enrichment, or 0.22 grams uranium per liter or both. For criticality safety control purposes, as an example, enrichment and concentration may be independently controlled. A comparison is made between the upper threshold value and actual concentration and/or enrichment by a comparing arrangement 14. The comparing arrangement 14 can be a computer, for example, or a computer system associated with the energy analyzer 12. The comparing arrangement 14 can have a memory to store and compare data to allow a user to retrieve desire information. The comparing arrangement 14 may allow for alerting a user if an upper threshold value is exceeded.

If either the enrichment or concentration upper threshold values are exceeded, as determined by the comparing arrangement 14 or the analyzer 12, a processing of the soil exceeding either or both of these values is started. If exceeded, as an example, the processing may comprise adding a neutron poison 40 to the volume of soil 10 such that the additional neutron poison criticality control will allow processing. The neutron poison 40 may be gadolinium or boron as examples.

Any section of the volume of soil 10 may be removed and treated with the neutron poison 40, or the neutron poison 40 may be directly injected in-situ into the section of the volume of soil 10 exceeding the enrichment or concentration values. After the enriched uranium-bearing soils and sands are either removed with or without neutron poison 40, the volume 10 may be resurveyed with the analyzer 12. Beaker samples of the soil may also be obtained before and after neutron poison 40 injection or soil removal for further testing. The beaker samples may be analyzed for uranium content, using chemical or other analytical methods.

A lower threshold value, or target cleanup level, is then established. The target cleanup level may be established through regulatory requirement, or through a desired value, for example 14 ppmw Uranium (at 3% Uranium 235 enrichment). The target cleanup level may be stored in the comparing arrangement 14 which will process data during separating steps. Any soils not meeting the target cleanup level may be segregated for processing and further processed.

The in-situ soil 10 is removed, for example, by earth moving vehicle to a transporting arrangement 16. Three separation operation steps, for example, may be used to separate most of the enriched uranium from the soil and/or sand and other materials. The first step is to transport the soil and/or sand by a transporting arrangement 16 configured to receive the volume of soil 10. The transporting arrangement 16 is configured to transport the volume of soil 10 from a start point 42 to an end point 44.

The soil and/or sand is transported along the transporting arrangement 16 to a coarse screen 18. The coarse screen 18 is configured to separate rocks and other coarse materials from the remainder of the volume of soil 10 through agitation. As an example, the coarse screen 18 is configured to segregate materials that are greater than 50 to 100 millimeters in diameter into a coarse pile 61. A volume of water may be added to the coarse screen 18 to allow the volume of soil 10 to be easily segregated. The volume of water may be added through a water adding arrangement 24.

The volume of soil passing the coarse screen 68 may then be transported by the transporting arrangement 16 to a deck screen 20 or directly deposited in the deck screen 20. An additional volume of water may be added to the volume of soil passing the coarse screen 68 to allow a slurry to form. The volume of water may be recycled wash water from other processes, as an example and may be added by the water adding arrangement 24. The deck screen 20 may be a triple deck screen, for example, and be 5 feet by 14 feet in rectangular cross section. The deck screen 20 may separate materials in the volume of soil passing the coarse screen 18 that are between 2 and 50 millimeters in diameter into a volume of soil not passing the deck screen 60 and a volume of soil passing the deck screen 62. The volume of soil not passing the deck screen 60 may be a fraction greater than 51 millimeters in diameter 64 and a fraction between 2 and 51 millimeters in diameter 66. The volume of soil passing the deck screen 20 then may be transported by the transporting arrangement 16 to a classifier 22. The transporting arrangement 16 may be additionally configured to pump slurries and/or water added to the volume of soil.

The classifier 22 is configured to accept the volume of soil passing the deck screen 20, scrub this volume and classify the volume into a less than 0.125 millimeter fines volume 50 and a 0.125 to 2 millimeter washed fraction 52, as examples. Other classifications may be made according to the individual soil conditions. The classifier 22 may be a spiral classifier, as an example. At all points, all volumes of materials being processed may be monitored with energy analyzers to identify if any fractions of materials contain radioactive elements in excess of upper threshold values or monitor for target clean up values.

Through experimentation, it has been identified that a majority of the uranium present in soils is found in the fines slurry (less than 0.125 to 2 millimeter diameter particles). This fines slurry may then be separately treated for removal of constituent elements in the slurry. Experimentation has also discovered that slimes and sludges may also be present in the classifier 22 and that these slimes and sludges along with soluble silicon remain in solution in the transported slurry. In an alternative embodiment of the present invention, solids can be fed into an attrition scrubber before or after the deck screen 20 to break down sludges and slimes.

Slurries containing the fines, water and contaminants are pumped through a pump 30 to a tank 32 for analysis and appropriately processed depending on uranium content, soluble silicon content and oxidation state of the uranium. Steam, heat and chemicals may be added to the tank. The feed taken off of tank 32 maybe transported by pump to a filter press 99.

If the uranium (IV, insoluble) or uranium (VI, soluble) concentrations are present in low concentrations in the slurry (i.e. below the threshold values) and silicon concentrations levels are low (for example less than 100 parts per million), then the slurry may be processed for uranium recovery from the filtrate phase according to U.S. Pat. No. 6,010,671, where soils and sands are heated to 160 degrees F. and treated with sodium hypochlorite, (for example 12.5%), to convert insoluble uranium (IV) to soluble uranium (VI). Excess uranium (VI) may be recovered from the filtrate by reduction, settling, and filtration by U.S. Pat. No. 4,668,482. Interconnections between the present application and U.S. Pat. Nos. 6,010,671 and 4,668,482 are presented in FIG. 2. Filtration may be through cellulose filtration media which is non-reactive with uranium and non-absorptive of uranium in the form of a raw cellulose slurry. A filtration device 100 may be provided to accept the raw cellulose slurry to the filtration device 100 in an amount sufficient to form a coating layer. The dissolved uranium containing slurry may be passed through a cellulose coated filtration device 100 such that solids in the uranium containing slurry are captured in the filtration device 100 and dissolved uranium passes therethrough in a liquid filtration.

Figure 2:
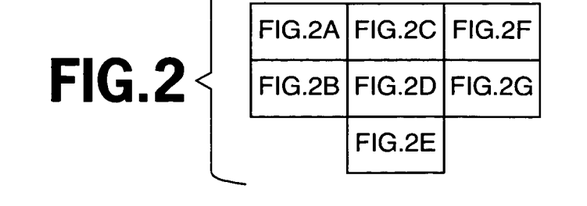
FIG. 2 presents an interconnection schematic of the present application with U.S. Pat. Nos. 4,668,482, 6,010,671, 6,165,367.
Figure 2A:
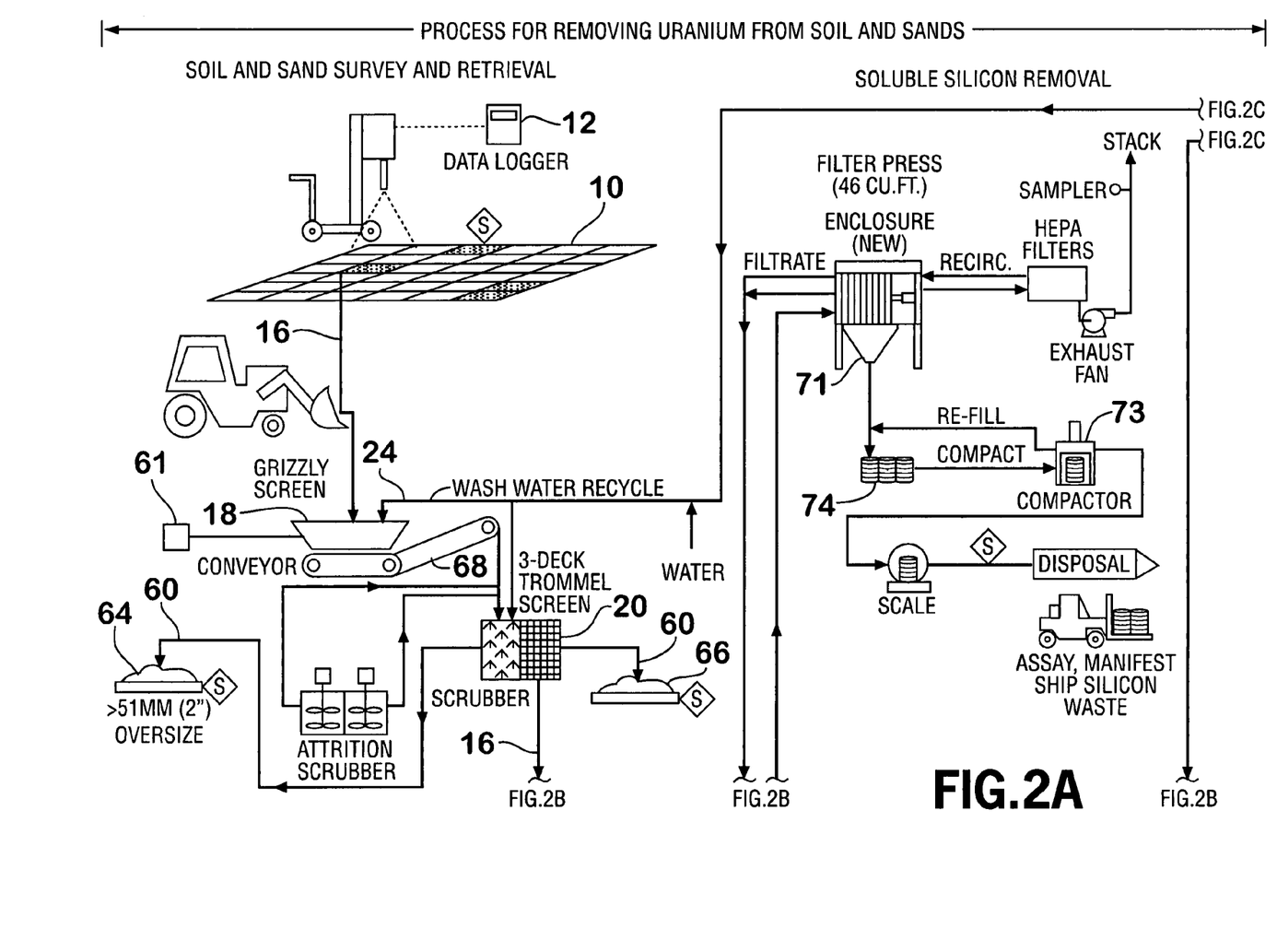
Figure 2B:
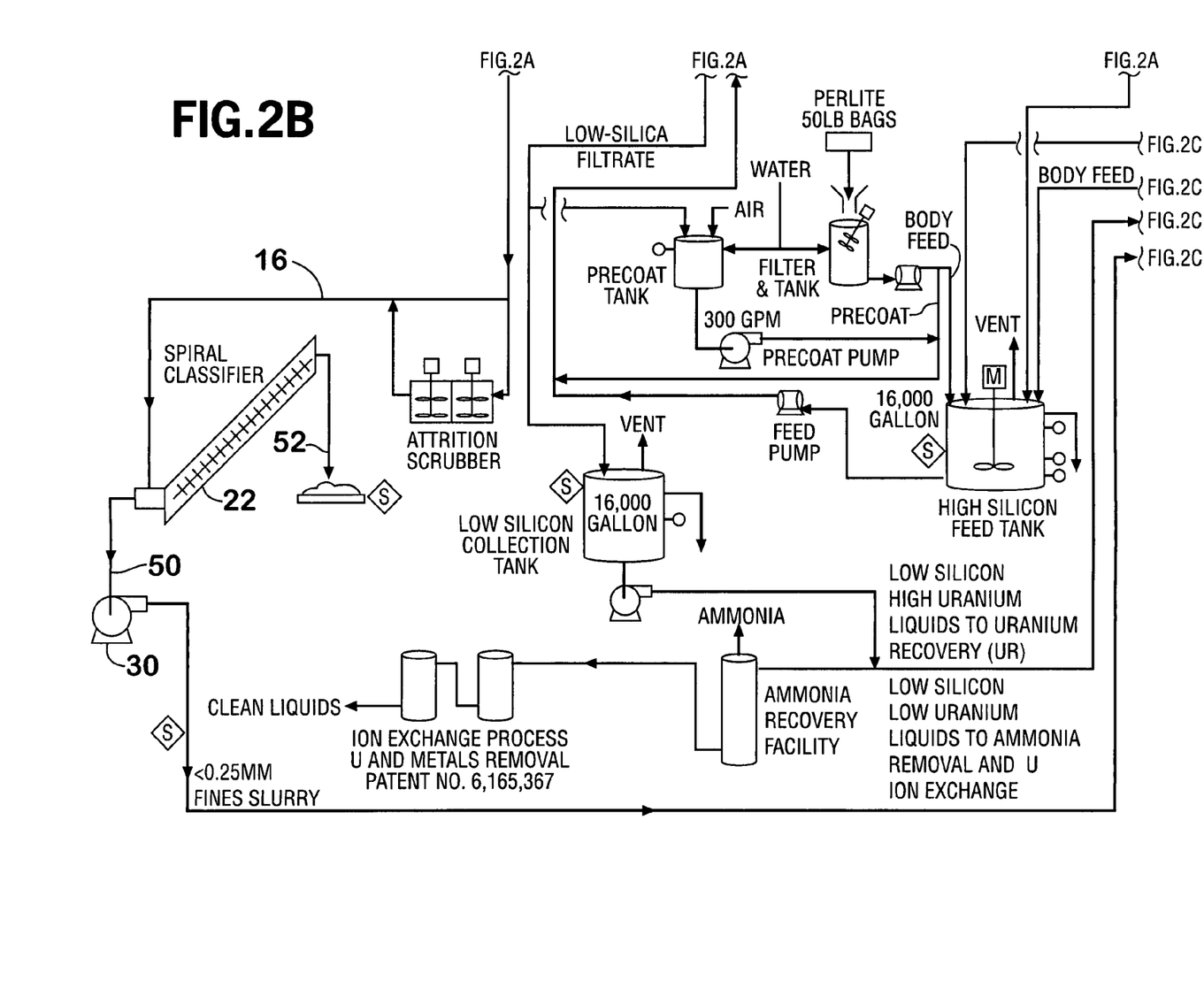
Figure 2C:
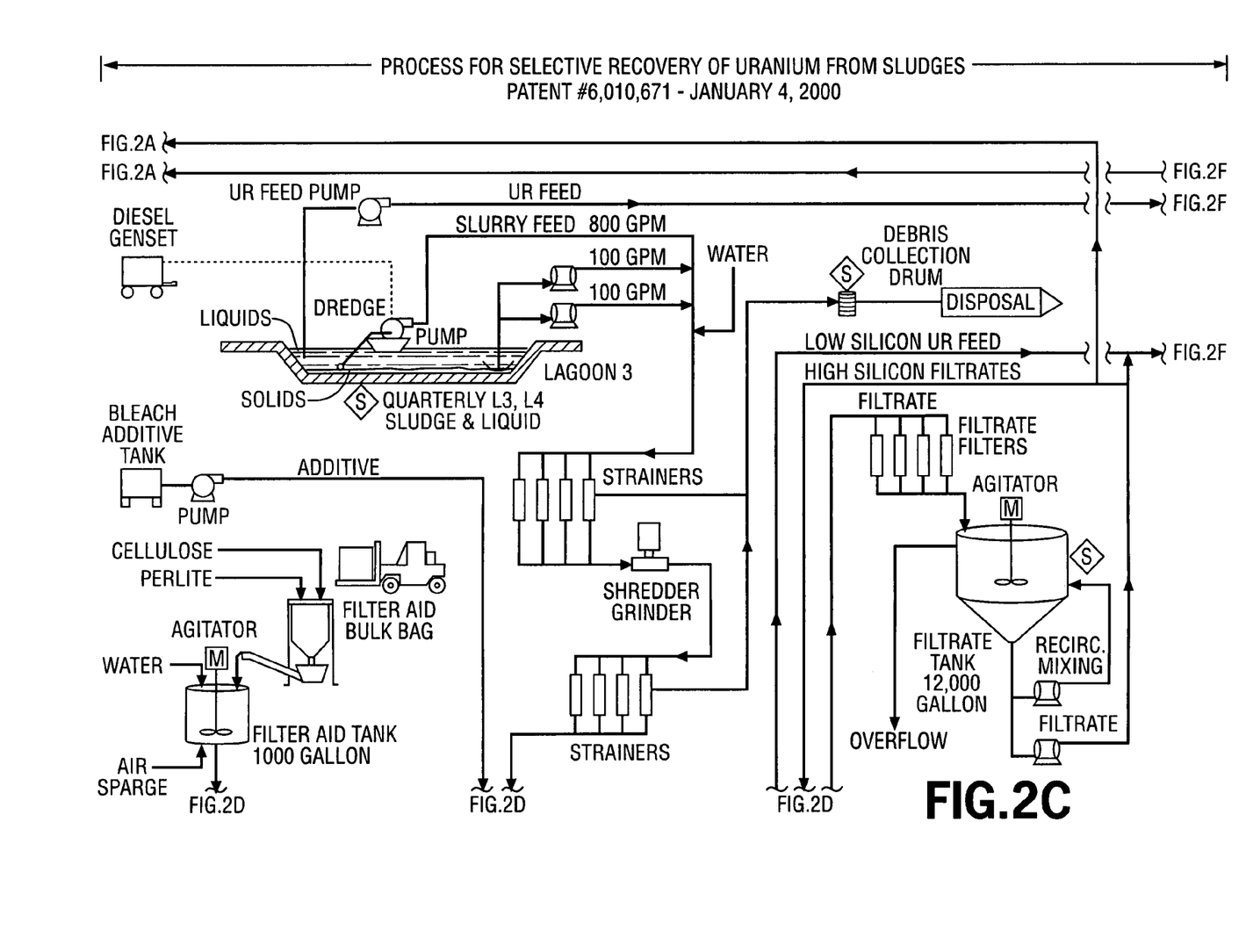
Figure 2D:
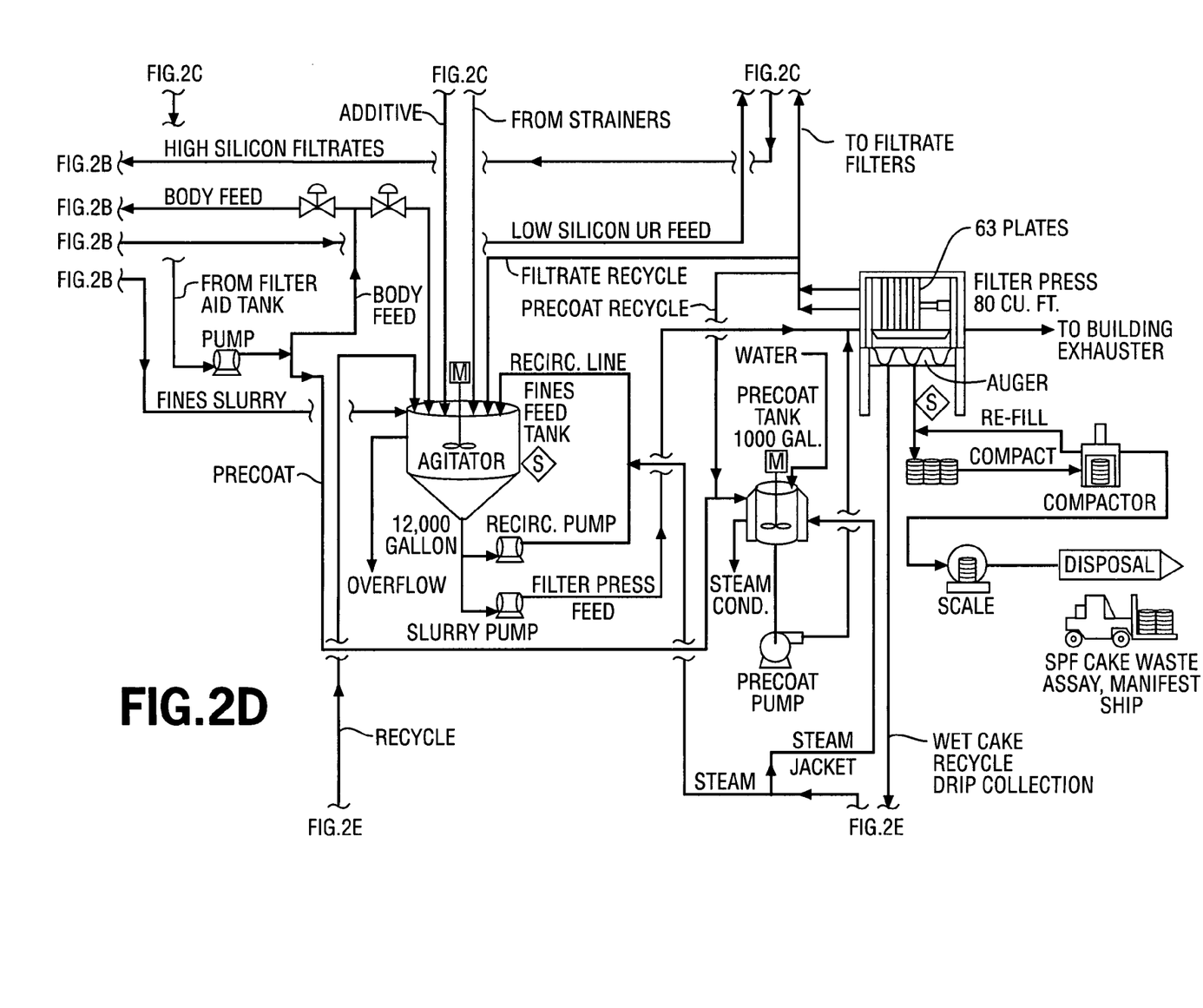
Figure 2E:
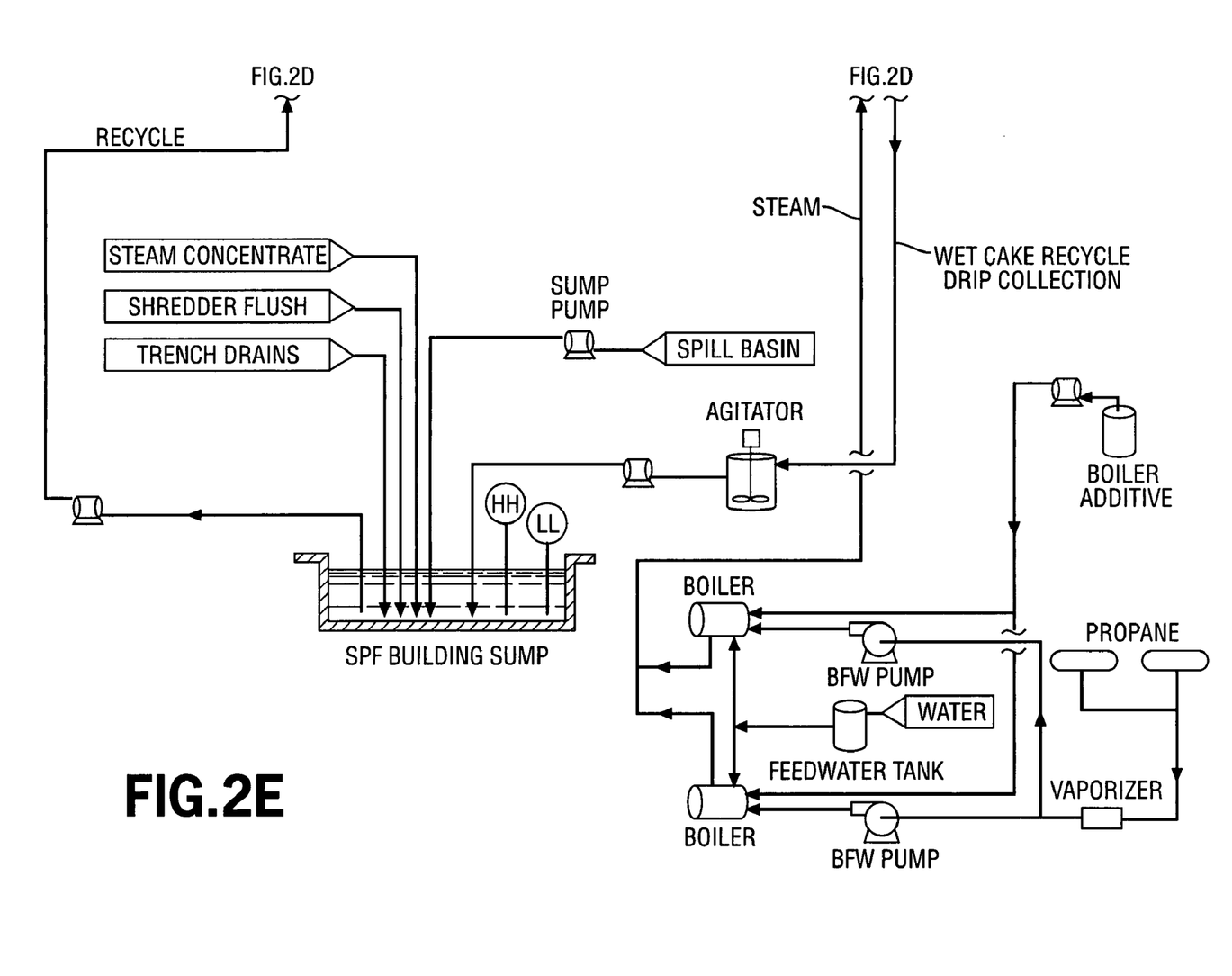
Figure 2F:
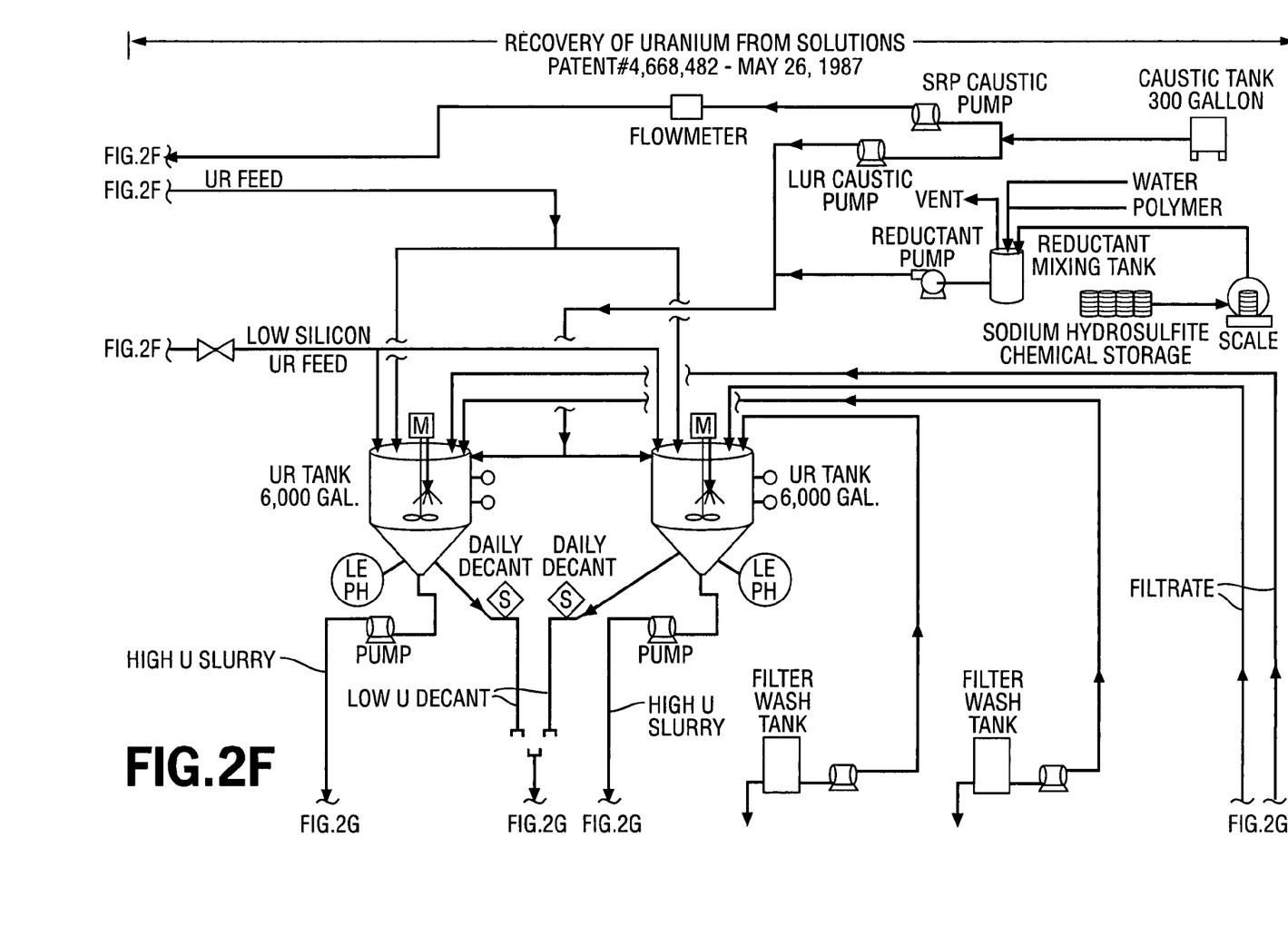
Figure 2G:
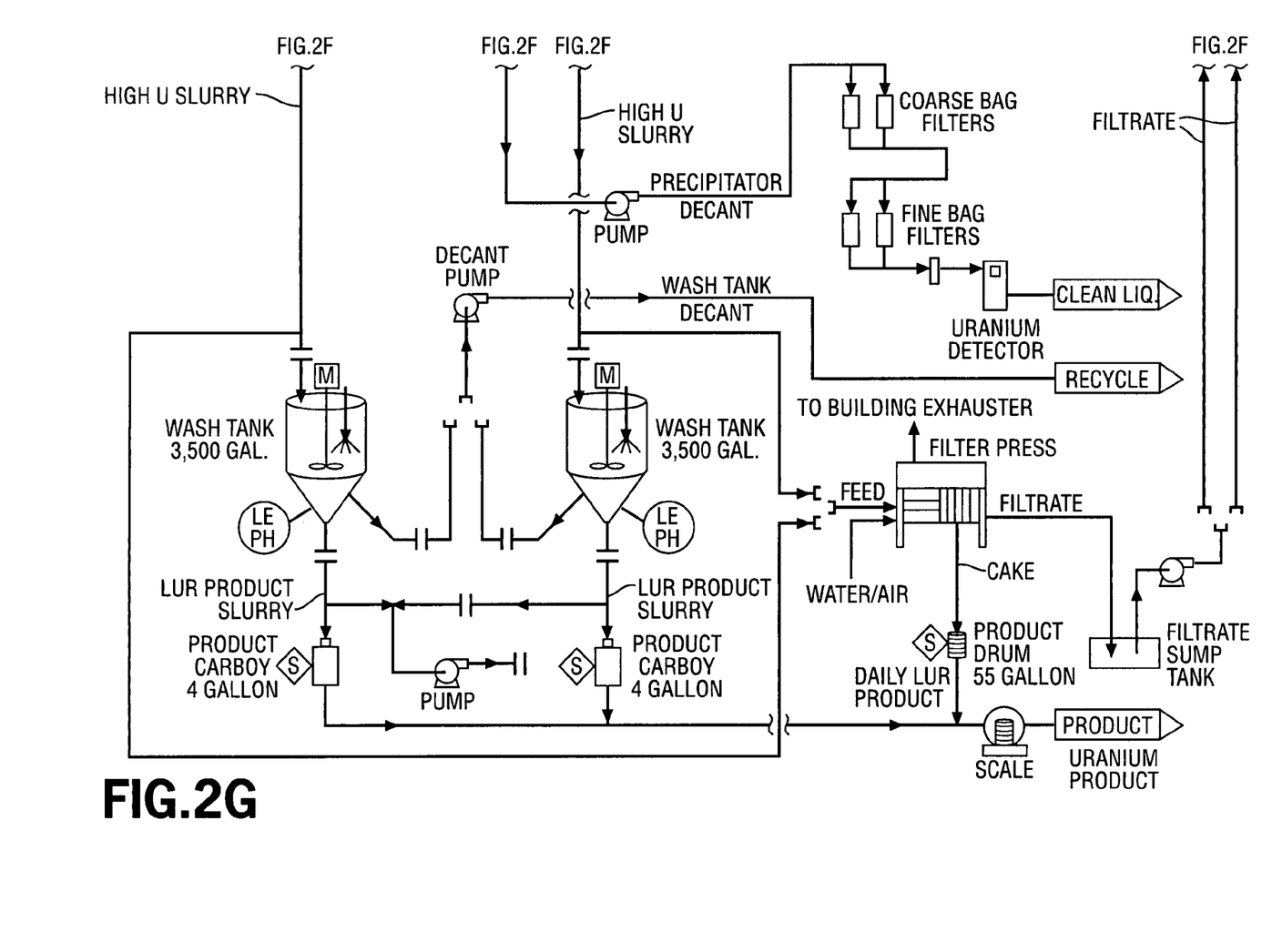

When one of uranium (IV) and uranium (VI) are present in the slurry and silicon concentrations are greater than 100 parts per million by volume 70, filtrates from a process for selective recovery of uranium from sludges are transported to a tank 102, and silicon removal tank 71 where pH is tested, the pH is adjusted to between 8.2 and 8.4 with caustic 72 such that silicon is precipitated in the tank 71. Body feed filter aid 75 and precoat filter aid 76 are added. Silicon is removed via filter press 73 and collected in containers 74. Clean, low silicon filtrates are collected in a tank 77. The filter aids may be made of perlite, as an example. The filtrate may then be preheated and steam stripped to a pH between 8.9 and 10. Finally, the filtrate may be processed to remove heavy metal ions using a chelating resin, the resin containing amino-phosphonic groups for capturing heavy metal ions, contacting the resin with the filtrate absent the precipitated silicon to reduce the heavy metal ions concentration to less than 1 ppm, eluting the resin by contact with a sequestering agent and regenerating the resin for another cycle.

If uranium levels are low and soluble silicon is greater than 100 ppmv, for example, filtrates can be pretreated for silicon removal before ammonia is recovered from the liquid. For example, low uranium filtrates from U.S. Pat. No. 6,010,171 may be pumped to a tank 104 where the pH is adjusted to a range of 8.2 to 8.4. This pH range allows silicon to be precipitated while minimizing the amount of ammonium salts, if present, that are converted to hazardous ammonium hydroxide. The precipitated silicon, in the form of a gelatin-like material, may then be added to a perlite filter and a filter press used so that a low-silicon liquid can be expressed out of the silica gel, and then the gel can be further dewatered and disposed.

Low silicon liquids can be processed for ammonia recovery which includes preheating and steam stripping at a pH of 8.9 to 10. At this pH, any significant soluble silicon is converted to a gelatin and coats heat exchanges, stripper column plates and pH probes, significantly reducing ammonia process capacity. Low uranium liquids which have successfully had ammonia removed can be processed via ion exchange under U.S. Pat. No. 6,165,367. For example, steps for further processing for the filtrate absent the precipitated silicon may remove heavy metal ions. The filtrate absent the precipitated silicon may contain a plurality of complexing anions selected from the group consisting of sulfates, nitrates, fluorides, chlorides and carbonates. A chelating resin may be provided, where the resin contains amino-phosphonic groups for capturing the heavy metal ions. The resin may be contacted with the filtrate absent the precipitated silicon to reduce the heavy metal ions concentration to less than 1 ppm. The resin may be eluted by contacting with a sequestering agent. The resin may be regenerated for another cycle.

The present invention provides an apparatus and method which allows soils to be prepared to be separated from uranium contamination. The use of the in-situ energy analyzer 12 provides a superior and cost effective method to characterize the volume of soil 10 compared to grab sampling and chemical extraction. The in-situ energy analyzer 12 eliminates laboratory labor and analytical costs associated with chemical methods. The in-situ energy analyzer 12 furthermore eliminates other chemical disposal costs typically associated with chemical extraction. Moreover, the in-situ analyzer 12 allows the characterization of the volume of soil 10 eliminating worker safety and radiological contamination concerns for analysis workers.

In the foregoing specification, the invention has been described with reference to specific exemplary embodiments, thereof. It will, however, be evident that various modifications and changes may be made thereunto without departing from the broader spirit and scope of the invention as set forth in the claims. The specification and drawings are accordingly to be regarded in an illustrative rather than a restrictive sense.

What is claimed is:

1. A method for aiding in the removal of uranium from soil, comprising:
    assaying a volume of soil using an in-situ energy analyzer;
    determining a presence and position of uranium enrichment in the volume of soil;
    determining a concentration of uranium and a uranium enrichment of the volume of soil;
    comparing the concentration of uranium and the uranium enrichment in the volume of soil to a threshold value; and
    processing the volume of soil when at least one selected from the group consisting of the concentration of uranium of and the uranium enrichment of the volume of soil exceeds the threshold value;
    wherein the processing comprises:
    establishing a target cleanup level;
    transporting the volume of soil to a coarse screen;
    screening the volume of soil through the coarse screen, wherein the volume of soil is screened into a volume of soil passing through the coarse screen and a volume of soil not passing through the coarse screen;
    assaying the volume of soil not passing through the coarse screen to determine if the radioactivity exceeds the target cleanup level;
    segregating a section of the volume of soil not passing through the coarse screen and exceeding the target cleanup level;
    transporting the volume of soil passing through the coarse screen to a deck screen;
    adding a volume of water to the volume of soil passing through the coarse screen;
    screening the volume of water and the volume of soil passing through the coarse screen through the deck screen to obtain a volume of soil passing through the deck screen and at least a first volume and a second volume of soil not passing through the deck screen, the first volume of soil not passing through the deck screen having diameters greater than the second volume of soil not passing through the deck screen;
    assaying the volume of soil not passing through the deck screen to determine if the radioactivity exceeds the target cleanup level;
    segregating a section of the volume of soil not passing through the deck screen and exceeding the target cleanup level;
    transporting the volume of soil passing through the deck screen to a classifier;
    classifying the volume of soil passing through the deck screen in the classifier into a washed fraction and a fines fraction;
    assaying the washed fraction and the fines fraction with an energy analyzer; and
    transporting the fines fraction to a uranium recovery facility.

2. The method according to claim 1, wherein the energy analyzer is a high purity germanium field gamma energy analyzer.

3. The method according to claim 1, wherein the threshold value is 4% by weight of uranium 235 to the weight of the soil.

4. The method according to claim 1, wherein the processing further comprises adding a neutron poison to the volume of soil such that one selected from the group consisting of the concentration of uranium and the uranium enrichment of the volume of soil falls below the threshold value.

5. The method according to claim 4, wherein the neutron poison is gadolinium.

6. The method according to claim 4, wherein the neutron poison is boron.

7. The method according to claim 1, further comprising:
    reassaying one selected from the group consisting of the volume of soil, the volume of soil passing through the coarse screen, the volume of soil not passing through the coarse screen, the volume of soil passing through the deck screen, and the volume of soil not passing through the deck screen.

8. The method according to claim 7, wherein the reassaying is performed with a gamma energy analyzer.

9. The method according to claim 1, wherein after each of the steps of:
    assaying a volume of soil using an in situ energy analyzer;
    determining a presence and position of uranium enrichment in the volume of soil;
    determining a concentration of uranium and a uranium enrichment of the volume of soil;
    comparing the concentration of uranium and the uranium enrichment to a threshold concentration; and
    processing the volume of soil when at least one of the concentration of uranium and the uranium enrichment exceeds the threshold concentration, samples are obtained from the volume of soil and analyzed for uranium content.

10. The method according to claim 1, wherein the coarse screen is configured to segregate materials larger than 50 millimeters.

11. The method according to claim 1, wherein the deck screen is configured to segregate materials between 2 to 50 millimeters in diameter.

12. The method according to claim 1, wherein the deck screen is a triple deck screen.

13. The method according to claim 1, wherein the classifier is a spiral classifier.

14. The method according to claim 1, wherein the washed fraction is from 0.125 to 2 millimeters in diameter.

15. The method according to claim 1, wherein the fines fraction is less than 0.125 millimeters in diameter.

16. The method according to claim 1, further comprising:
    passing one selected from the group consisting of the volume of soil passing through the coarse screen and the volume of soil not passing through the coarse screen through an attrition scrubber.

17. The method according to claim 1, further comprising:
    passing one selected from the group consisting of the volume of soil passing through the deck screen and the volume of soil not passing through the deck screen through an attrition scrubber.

18. The method according to claim 1, wherein one of uranium (IV) and uranium (VI) are present in a slurry made from the fines fraction and silicon concentrations of the slurry are less than 100 parts per million, and wherein the uranium recovery facility performs the steps of:

adding a uranium dissolving compound to the slurry to dissolve the uranium;

heating the slurry containing the uranium in the form of the slurry;

providing a cellulose filtration media which is non reactive with uranium and non-absorptive of uranium in the form of a raw cellulose slurry;

providing a filtration device;

feeding the raw cellulose slurry to the filtration device in an amount sufficient to form a coating layer therein; and passing the dissolved uranium containing slurry through the cellulose coated filtration device such that solids in the uranium containing slurry are captured in the filtration device and dissolved uranium passes therethrough in a liquid filtrate.

19. The method according to claim 1, wherein one of uranium (IV) and uranium (VI) are present in a slurry made from the fines fraction and the silicon concentrations of the slurry are greater than 100 parts per million by volume, and wherein the uranium recovery facility performs the steps of:

transporting filtrates from a process for selective recovery of uranium from sludges to a tank;

testing a pH of the filtrate in the tank;

adjusting the pH of the filtrate in the tank to between 8.2 and 8.4;

precipitating silicon from the filtrate in the tank;

removing the filtrate absent the precipitated silicon from the tank;

preheating the filtrate absent the precipitated silicon;

steam stripping the filtrate absent the precipitated silicon to a pH between 8.9 and 10 to remove ammonia; and processing the filtrate absent the precipitated silicon to remove heavy metal ions, the filtrate absent the precipitated silicon containing a plurality of complexing anions selected from the group consisting of sulfates, nitrates, fluorides, chlorides and carbonates, wherein a chelating resin is provided, the resin containing amino phosphonic groups for capturing the heavy metal ions;

contacting the resin with the filtrate absent the precipitated silicon to reduce the heavy metal ions concentration to less than 1 ppm;

eluting the resin by contact with a sequestering agent; and regenerating the resin for another cycle.

\* \* \* \* \*